Aug. 5, 1930. P. W. DOBBEN 1,772,133
DEVICE FOR RECTIFYING ALTERNATING CURRENT
Filed July 23, 1926

Inventor.
Pieter Wilhelm Dobben
By: E.T & J.F. Brandenburg
Attorneys.

Patented Aug. 5, 1930

1,772,133

UNITED STATES PATENT OFFICE

PIETER WILHELM DOBBEN, OF EINDHOVEN, NETHERLANDS, ASSIGNOR TO N. V. PHILIPS' GLOEILAMPENFABRIEKEN, OF EINDHOVEN, NETHERLANDS

DEVICE FOR RECTIFYING ALTERNATING CURRENT

Application filed July 23, 1926, Serial No. 124,440, and in the Netherlands October 7, 1925.

This invention has for its object when using discharge tubes as rectifiers for high tensions e. g. of about 80 v. to prevent the battery which has to be charged from being discharged in consequence of the fact that the supply of alternating current suddenly ceases, which may occur either when the alternating current is switched off on the primary side of the transformer or when in consequence of a disturbance in the supply of electricity the alternating current suddenly fails.

After the battery which has to be charged has been connected to the rectifier and the latter to the alternating current network, the batteries are automatically charged so that, generally speaking, supervision is not needed.

However, with rectifying apparatus for high tensions e. g. 80 volts and upwards, it is known that when the transformer is switched off on its primary side, there takes place in the discharge tube, in consequence of the inductive impulse then produced, a discharge in the wrong direction and consequently an electron current flowing from the anode to the cathode, which may result in the battery being discharged. Means to prevent the batteries from being discharged in consequence of the said phenomenon have not been known hitherto; stress has therefore always been laid on the fact that for causing the charging of the battery to cease, it is necessary first to unscrew the rectifying lamp and then to switch off the transformer. It is therefore not advisable to charge the battery without supervision for example during the night, for it may happen that for some reason or other the supply of alternating current ceases so that the battery may be discharged instead of charged.

The invention provides a means to charge even high tension batteries without any supervision. A condenser is connected in parallel to the rectifying tube; when now the alternating current fails, the energy in the secondary circuit produced in consequence of the inductive impulse, will be received by the condenser and a discharge in the wrong direction will not be produced. The best value for the capacity of this condenser lies for the cases which in practice mostly occur, in the neighbourhood of 1 microfarad.

Figure 1:
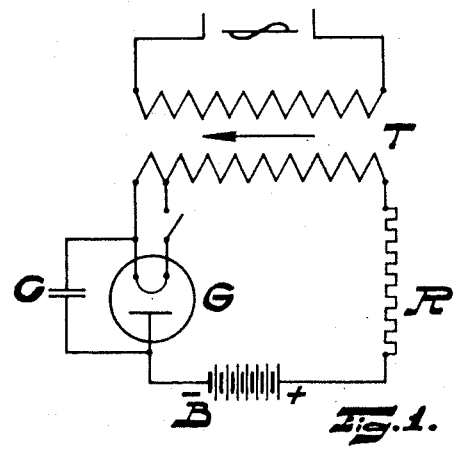

The invention will be more clearly understood by referring to the accompanying drawings in which Figure 1 represents a rectifying installation comprising one discharge tube so that one half of the alternating current wave is rectified. T refers to a transformer, R to a resistance, C to a capacity, G to a rectifying tube and B to a battery which has to be charged. If, when the transformer is switched off, an inductive impulse is produced in the direction indicated by the arrow, the battery would be discharged but for the capacity C. Now, however, the current impulse is received by the condenser and a return impulse in the discharge tube is prevented.

Figure 2:
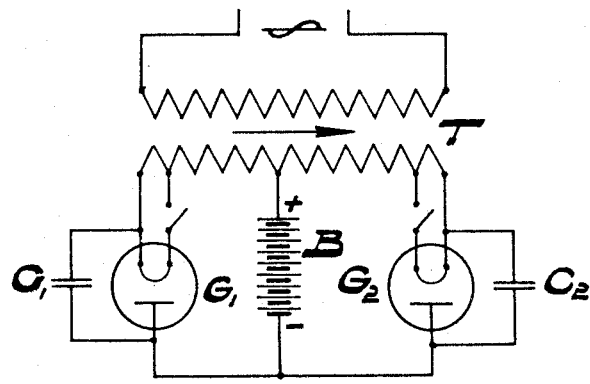

Figure 2 represents a rectifying installation whereby the two halves of the alternating current wave are rectified. If in this case an inductive impulse in the direction indicated by the arrow is produced, the battery might be discharged through $G_2$ which, however, is now prevented by the condenser $C_2$.

What I claim is:—

1. An alternating-current rectifying device comprising an electric discharge tube supplied by a transformer and a condenser having a capacity of the order of one microfarad connected in parallel to said discharge tube.

2. An alternating current rectifying device comprising at least one discharge tube supplied by a transformer and a condenser in parallel to said discharge tube of such a capacity that it is effective to store inductive impulses taking place in the secondary winding of the transformer, so that the tension at the cathode does not increase so much that a discharge in the wrong direction in the tube may occur.

In testimony whereof I affix my signature at the city of Eindhoven, this first day of July, A. D. 1926.

PIETER WILHELM DOBBEN.